Jan. 10, 1961 R. E. JENSEN 2,967,394
COMBUSTION APPARATUS
Filed Dec. 14, 1959
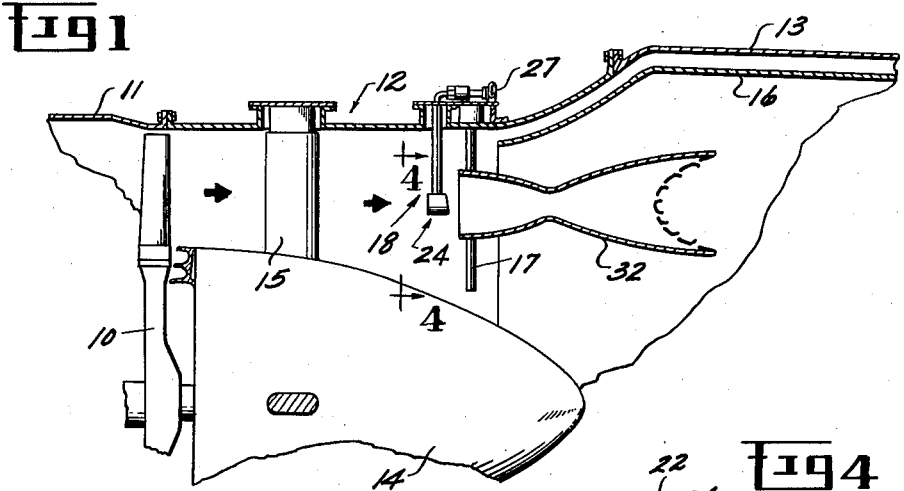
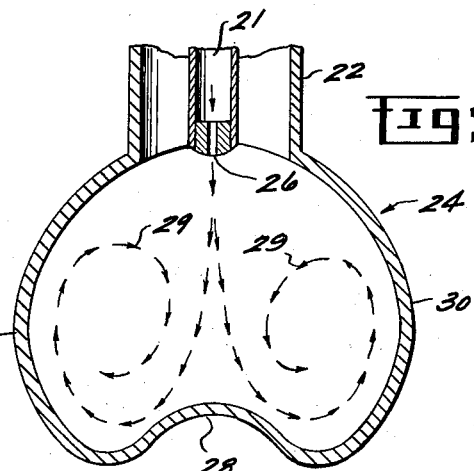
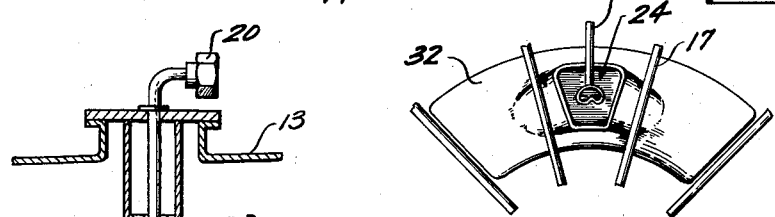
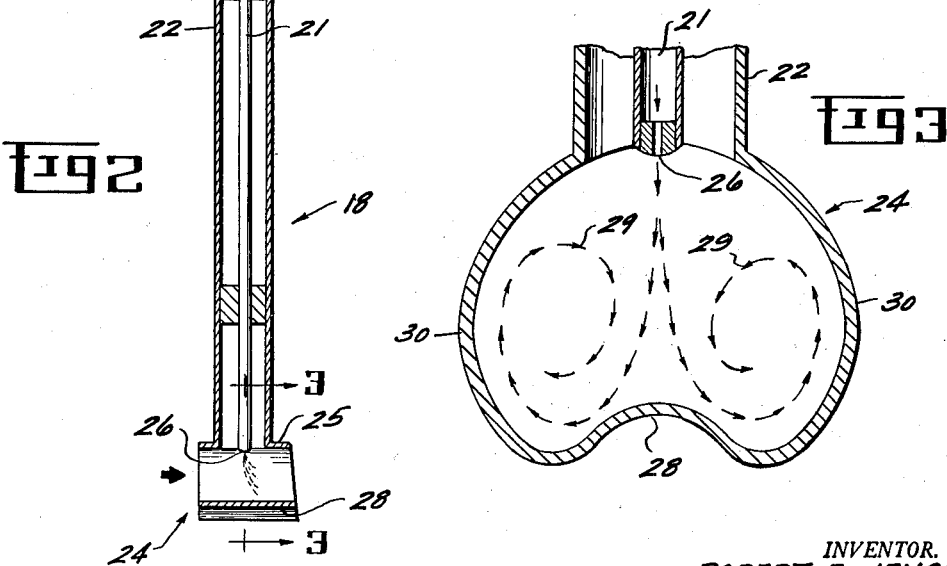
INVENTOR.
ROBERT E. JENSEN
BY
Harry C. Burgess
ATTORNEY

United States Patent Office 2,967,394
Patented Jan. 10, 1961

2,967,394
COMBUSTION APPARATUS

Robert Elmer Jensen, North Reading, Mass., assignor to General Electric Company, a corporation of New York Filed Dec. 14, 1959, Ser. No. 859,238

5 Claims. (Cl. 60—39.74)

This invention relates to combustion apparatus and, more particularly, to apparatus for mixing liquid fuel with a combustible gas stream in a jet engine duct.

One of the problems facing designers of jet engines has been insuring that liquid fuel introduced into a stream of combustible gases moving at high velocity through a duct, which forms part of the engine, will burn under certain adverse conditions. For example, should a "flame-out" occur in, say, a turbojet engine installed in an aircraft cruising at a relatively high altitude, it may prove difficult to restart the engine due to the speed of the aircraft and the reduced density of the air. It has been found, however, that restarting in such cases may be facilitated by insuring that certain desirable conditions of combustible gas flow and liquid fuel mixing are enhanced.

In particular, improved mixing conditions are desirable in the case of a jet engine utilizing a thrust augmentation or "afterburner" system. It has been found advantageous in such instances to utilize one or more pilot burners in conjunction with a plurality of main fuel burners which are usually positioned immediately upstream of the afterburner. The pilot burner may consist simply of a spraybar or auxiliary fuel tube positioned upstream of the main fuel spraybars so as to cause premixing of the hot combustion gases and the liquid fuel prior to the combined flow entering the afterburner area. Premixing, if accomplished in an optimum manner, will substantially improve thrust augmenting combustion in the afterburner.

However, placing one or more pilot burners in a combustible gas stream moving in a jet engine duct may, and quite often does, have a detrimental effect on certain of the engine flow characteristics, e.g., local distortion of gas flow and increase in pressure losses in the area of the auxiliary burners. It would be desirable, therefore, to provide a pilot burner which would facilitate the combustion process, particularly in the afterburner, by premixing the fuel and the gas stream but which would not unduly disturb optimum gas flow in the jet engine.

Accordingly, an object of the invention is to provide an improved combustion apparatus for mixing fuel with a combustible gas stream in a jet engine.

A further object of the invention is to provide an improved pilot burner assembly for mixing liquid fuel with a combustible gas stream in a jet engine duct to facilitate burning in the duct.

Another object of my invention is to provide a pilot burner assembly for use in a jet engine having thrust augmentation means which will premix liquid fuel and hot combustion gases flowing in a duct which is part of the engine prior to the combined flow entering the thrust augmentation area.

Briefly, in one embodiment of my invention, I provide an improved combustion apparatus comprising a pilot burner assembly including liquid fuel supplying means extending inwardly of a jet engine duct entraining a stream of hot combustion gases, shielding means for said fuel supplying means, and flow-splitting means attached to the shielding means and immersed in the hot gas stream, the flow-splitting means combining with the hot gas stream to cause intimate co-mingling of the fuel and hot gases to facilitate burning.

While the specification concludes with claims particularly pointing out and distinctly claiming the subject matter which I regard as my invention, it is believed the invention will be better understood from the following description taken in conjunction with the accompanying drawings in which:

Fig. 1 is a sectional view illustrating the placement of my invention in a jet engine having thrust augmentation means; and Fig. 2 is a sectional view of an embodiment of my novel pilot burner assembly; and Fig. 3 is an enlarged cross-sectional view of the flow-splitting means, taken on line 3—3 of Fig. 2, and illustrating the spiral fuel flow paths; and Fig. 4 is a pictorial view downstream of the engine afterburner section, taken on line 4—4 of Fig. 1, illustrating the main spraybars and the pilot burner assembly.

Fig. 1 of the drawings shows the location of my improved combustion apparatus in relation to certain other sections of a jet engine which, as will be obvious to those skilled in the art, is a typical axial-flow gas turbine engine having thrust augmentation means. A turbine wheel 10, contained within a casing 11, is adapted to be acted upon in the conventional manner by a stream of hot combustion gases, indicated by the arrows, emerging from a combustion section (not shown) of the engine. Immediately downstream of the turbine section is an afterburner diffuser casing, indicated generally at 12, adapted to be connected to an afterburner outer casing 13 to form the exhaust section of the engine. Situated co-axially with the diffuser casing 12 is a center body 14 supported by a plurality of struts 15 adapted to form a combustion duct in cooperation with the casing. Positioned concentrically of the afterburner casing 13 is a liner 16, which may be of any suitable configuration well known in afterburner design.

Immediately upstream of the afterburner liner are disposed a plurality of radially-extending main fuel tubes, or spraybars of which one is shown at 17. These main spraybars are the primary source of liquid fuel to be combined and burned with the hot combustible gas flow in the afterburner liner.

The pilot burner assembly, which comprises the heart of my improved combustion apparatus, is indicated generally at 18. By referring specifically to Fig. 2, it will be seen that the assembly is provided with a liquid fuel inlet fitting 20 adapted to be connected to a "hypodermic" fuel tube 21 having a fuel orifice 26. The tube 21 is "hypodermic," i.e., having a relatively small diameter, say, on the order of $\frac{1}{10}$ or less of the spraybar diameter, to insure an increase in fuel velocity and minimize heat transfer, and to prevent vaporization and coking within the tube. About the tube 21 is an outer shield 22 positioned concentrically of the tube by means of a plurality of resilient spacers 23. Attached to the shield and positioned in a parallel relationship to the hot gas stream moving in the engine duct is an open-ended tubular member 24. The tubular member or "splashplate," which may also be formed integrally with the shield, has an aperture 25 which allows the orifice to project slightly into the interior of the tubular member. The spacers 23, in addition to concentrically positioning the fuel supply tube within the shield 22, thus helping to obtain optimum insulation of the tube, also maintain the orifice 26 in the desired position with respect to the "splashplate" and act as snubbers against vibration. Fuel is supplied to the fuel inlet fitting 20 by any suitable means, such as a manifold indicated at 27 in Fig. 1.

Fig. 3 perhaps best illustrates the manner in which the tubular member or "splashplate" 24 effectuates optimum mixing of the fuel and the hot gas stream. As the fuel emerges from the slightly projecting orifice 26 it is directed into the interior of the member. Directly opposite the orifice and projecting radially-inward of the member toward the orifice is an indentation or convexity 28 in the far wall of the member. This rounded indentation or "dimple" acts as a flow splitter for the liquid fuel. Since the tubular member is aligned axially with the duct in which the hot combustion gas flow is moving, the geometrical configuration of the member, i.e., it is generally cardioid in cross-section, causes a condition wherein the efflux of fluid from the member will have a positive direction and be premixed with the gas stream.

By referring to the arrows 29 in Fig. 3 it will be observed that the fluid from the orifice 26 is divided substantially in half by the convexity 28 with the resultant two streams being directed away from each other to a point where they contact the oppositely-disposed walls 30—30 of the cardioid sections. Due to the curved configuration of these cardioid sections, the fuel attempts to climb up the walls and back towards the orifice. However, since the hot gas stream is moving at right angles to the fuel when it first leaves the orifice, the result is the formation of a pair of gradually-spiraling vortices of combined fuel and hot gases moving outwardly of the confines of the "splashplate," i.e., downstream of the duct and into the main afterburner liner area.

To facilitate the combustion process in the duct, a flameholder may be provided immediately downstream of the pilot burner assembly. The flameholder shown is in the form of an annular member 32 comprising four scoop sections circumferentially disposed about the interior of the afterburner, although it will be understood that other types of flameholders will function equally as well.

The invention is adapted to present a minimum profile to a stream of hot gases moving in a duct to minimize the gasdynamic loadings on a pilot burner assembly, as well as insuring low pilot burner system pressure losses. The brief containment of the split flow within the confines of the tubular member, in the presence of the hot gas stream, gives the heated fuel its positive direction and results in the optimum premixing, i.e., premixing is initiated at a more advantageous time since with my apparatus, among other things, the fuel is introduced into the gas stream directly after leaving the fuel orifice. In addition, the gas flow and the fuel flow enter the confines of the tubular member from separate, different dimensioned openings and, what is important, at right angles to each other, the latter being an essential feature of my invention. With this arrangement it has been found that pressure losses are especially low as compared to a "splashplate" having a flat configuration directly opposing the fuel orifice, or one which is positioned radially with respect to the hot gas stream. Obviously, the tubular flow splitter would be useful to facilitate the combustion process through improved mixing of fuel with a combustible gas stream in other sections of a jet engine.

Although a specific configuration of my novel combustion apparatus has been clearly described, this should not be construed as a limitation and it is intended to cover all changes and modifications in function and design which may fall within the scope and spirit of the invention.

Having thus described the invention, what is claimed as new and novel and desired to be secured by Letters Patent is:

1. Combustion apparatus for use in a duct entraining a hot combustible gas stream, said apparatus comprising: fuel supplying means extending transversely of the duct and into the combustible gas stream; a fuel orifice at the inner end of said fuel supplying means; shield means positioned concentrically with respect to said fuel supplying means and spaced therefrom; and fuel flow-splitting means attached to said shield means, said flow-splitting means comprising an open-ended tubular member arranged parallel to said gas stream and having an indentation in a wall thereof, said indentation being in direct opposed relationship with said orifice and so arranged with respect to the gas stream that fuel emitted from said orifice will strike said identation and at the same time impinge on said gas stream entering said open-ended member in such a manner as to cause intimate co-mingling of the fuel and gas stream to facilitate burning.

2. Combustion apparatus for use in a duct entraining a hot combustible gas stream, said apparatus comprising: a fuel supply tube extending transversely of said duct; a fuel orifice at the inner end of said tube; shield means in spaced concentric relation to said tube and co-extensive therewith, said shield means insulating said tube from the hot gas stream; resilient spacing means maintaining said concentricity and reducing vibration in said apparatus; and fuel flow-splitting means attached to said shield means adjacent said orifice, said flow-splitting means comprising an open-ended tubular member arranged parallel to the gas stream, said member having a longitudinally-extending indentation in a wall thereof in direct opposed relation with said orifice and so spaced from said orifice that fuel emitted therefrom will strike said indentation and split into separate flows and at the same time impinge on said gas stream entering the upstream end of said member in such a manner as to cause intimate co-mingling of the fuel and gas stream to facilitate burning.

3. In an axial-flow jet engine having a duct entraining a hot combustible gas stream and thrust augmentation means mounted rearwardly of said duct, fuel flow-splitting means cooperating with auxiliary fuel supplying means situated in said duct immediately forward of said thrust augmentation means, said flow-splitting means comprising an open-ended tubular member adapted to be immersed in the gas stream, the axis of said tubular member being parallel to the duct axis, said member including an indentation in a wall thereof projecting inwardly of the member and in opposed relation with said auxiliary fuel supplying means, said indentation being coextensive with said wall and so spaced with respect to said fuel supplying means that fuel emitted therefrom will strike said indentation and split into separate flows and at the same time impinge on the gas stream entering the upstream end of said tubular member in such a manner as to cause intimate co-mingling of the fuel and gas stream to facilitate burning in said thrust augmentation means.

4. In an axial flow jet engine having a duct entraining a hot combustible gas stream and thrust augmentation means including a plurality of main fuel spraybars mounted rearwardly of said duct, a pilot burner assembly situated in said duct immediately upstream of said main fuel spraybars comprising: at least one fuel supply tube connecting to a fuel source, said tube extending transversely of said duct and into said gas stream; shielding means coextensive with said fuel tube and adapted to protect the tube from local high temperatures in said gas stream; and an axially-extending tubular member attached to said shielding means adjacent the inner end of said fuel tube, said tubular member being open at both ends and having an aperture in a wall thereof for receiving said fuel tube inner end, said member including an axially-extending wall indentation directed inwardly thereof located directly opposite the inner end of the fuel tube and in a spaced relationship therewith, said indentation combining with the hot gas stream to cause oppositely spiraling vortices of co-mingled fuel and hot gases to move outwardly of said member to facilitate burning in said thrust augmentation means.

5. In an axial-flow jet engine having a duct entraining a hot combustible gas stream and thrust augmentation including a plurality of main fuel spraybars mounted rearwardly of the duct, a pilot burner assembly situated in said duct immediately upstream of said main fuel spraybars, said assembly comprising: a hypodermic transversely-extending fuel supply tube connected to a fuel source; insulating shield means for said tube comprising an outer tube concentric to the supply tube and spaced therefrom, said outer tube being of relatively large diameter with respect to said supply tube; resilient means maintaining said concentricity and reducing vibration in said assembly; and an axially-extending, open-ended hollow member attached to said shield means and immersed in said hot gas stream, said member including an aperture for receiving said supply tube and an axially-extending convexity in a wall thereof opposite said aperture, the apex of said convexity being on the projected center line of said fuel supply tube, said convexity and said hot gas stream combining to form oppositely spiraling vortices of co-mingled fuel and gas moving outwardly of said member to facilitate burning in said thrust augmentation means.

No references cited.